United States Patent [19]

Geipel

[11] Patent Number: 4,494,762
[45] Date of Patent: Jan. 22, 1985

[54] GASKET AND GASKET MANUFACTURING METHOD

[75] Inventor: Stanley W. Geipel, Bedminster, N.J.

[73] Assignee: Hickory Pond Corp., New Brunswick, N.J.

[21] Appl. No.: 174,808

[22] Filed: Aug. 4, 1980

[51] Int. Cl.³ .............................................. F16J 15/32
[52] U.S. Cl. ................................ 277/206 R; 277/180
[58] Field of Search .................... 277/205, 206 R, 180

[56] References Cited

U.S. PATENT DOCUMENTS

| | | |
|---|---|---|
| 2,041,132 | 5/1936 | Johnson . |
| 2,511,386 | 6/1950 | Warren . |
| 2,689,752 | 9/1954 | Webster . |
| 2,878,041 | 3/1959 | Hobbs . |
| 2,962,305 | 11/1960 | McCarthy et al. . |
| 3,302,953 | 2/1967 | Glasgow ............................ 277/206 |
| 3,377,226 | 4/1968 | Renwick ............................ 277/206 |
| 4,163,571 | 8/1979 | Nash . |

FOREIGN PATENT DOCUMENTS 656032  8/1951  United Kingdom ................ 277/180

*Primary Examiner*—Robert I. Smith
*Attorney, Agent, or Firm*—Charles E. Baxley

[57] ABSTRACT

The invention is directed to a metal bellows seal for use in high pressure, extreme temperature installations. The description shows not only a gasket made from a formed tube open on one side to leave a gap that exposes the gasket interior to high pressure process fluid, but also a fin protruding from the opposite side of the tube of a width that is equal to and in general alignment with the gap in the gasket. The gasket is seated within aligned grooves that are formed in opposing pipe flange faces. The fin, clamped between the opposing flanges stabilizes the gasket within the grooves and forms an aperture between the pipe ends that establishes fluid communication between the pipe and the interior of the tubular gasket.

3 Claims, 7 Drawing Figures

GASKET AND GASKET MANUFACTURING METHOD

This invention relates to gaskets and methods for manufacturing gaskets and more particularly to a metal gasket for sealing flanged high pressure pipe joints and the like.

The general trend in industrial growth for production processes is toward ever higher temperature and pressure operating conditions or alternatively toward extremely low temperature operation. Typically in refineries steam power plants and similar installations the need for better efficiency and greater productivity seems almost invariably to lead successively to higher levels of process fluid pressure operation.

In these circumstances there is an almost inescapable need in installations of this character to provide durable, inexpensive and simple techniques for joining together sections of pipe in a leakproof manner. Ordinarily pipe couplings of this nature are produced by bolting abutting annular flanges together at the ends of two adjacent lengths of pipe. Special effort should be taken to insure that the mutually opposing faces of these flanges form a tight, well machined fit in order to eliminate, or at least to reduce to a minimum, leakage through the joint. To insure a suitably tight fit it has been found useful to form mutually aligned annular grooves in the abutting flange faces. These grooves then provide a seating for a gasket that is pressed between the two flanges to improve the integrity of the seal at the flanged joint.

The particular gasket for any given application is chosen from a very large number of gaskets on the market by selecting that one gasket which is best suited to cope with the fluid that is to be contained within the pipe (or other vessel) as well as fluid temperature and process pressure. For example, if the pipe or vessel must be proof against very high pressure, a hollow gasket, the interior of which is exposed to the high pressure fluid within the piping, has been found useful. In this way the high process fluid pressure within the gasket causes the gasket to expand against the surfaces of the flange grooves within which it is seated, because of the difference in pressure between the process fluid within the pipe and the ambient pressure outside of the pipe. Thus the high process pressure is used to provide a better seal between the pipe flanges in which the gasket between the flanges adapts itself to a snug and generally leakproof fit with the surfaces of the grooves within which it is seated. A gasket of this design also accommodates thermally related pipe joint expansion and contraction. The following United States Patents are illustrative of a number of these proposed hollow gaskets.

U.S. Pat. No. 2,041,132 granted May 19, 1936 to H. F. Johnson for "Pipe Coupling" shows a C-shaped annular gasket that is formed of an elastic material.

U.S. Pat. No. 2,511,386 granted June 13, 1950 to D. C. Warren for "Seal for Swivel Joints" discloses a C-shaped packing body for a swivel joint.

U.S. Pat. No. 2,689,752 granted Sept. 21, 1954 to H. N. Webster for "Pipe Coupling" shows a circular gasket within body elements that are clamped over the mutually abutting ends of pipe at a joint.

U.S. Pat. No. 2,878,041 granted Mar. 17, 1959 to J. C. Hobbs for "Clamped Flange Joint With Means for Maintaining a Fluid Seal Under Varying Temperature Conditions" shows a flanged joint gasket in which the gasket has a hollow central portion that is in fluid communication with the interior of a pipe line.

U.S. Pat. No. 2,962,305 granted Nov. 29, 1960 to J. A. McCarthy et al. for "Coupling for Reinforced Resinous Pipe" discloses a structure that is similar to the Johnson, Webster and Hobbs patents described above.

U.S. Pat. No. 4,163,571 granted Aug. 7, 1979 to Nash for "Pipe Couplings" also shows an annular C-shaped seal mounted within a clamping ring that enclosed a pipe joint.

None of these proposed hollow gaskets, for various reasons have been entirely satisfactory. For instance, a need still exists for a reliable and inexpensive gasket that can be used with pressures that are in the order of 10,000 pounds per square inch, as well as with the high temperatures encountered in the oil and petroleum industries, or with the extremely low temperatures that characterize liquid oxygen service.

To satisfy this need solid metal gaskets with oval, octagonal or other suitable cross sections have been employed. Close tolerances in matching the gasket with the grooves that are formed in the abutting flange surfaces, however, are critical to the successful installation. Careful work of this nature is quite expensive and time consuming. Consequently, the requirement for an inexpensive, easy to install and durable gasket for use in these extreme service conditions still prevails.

This problem is solved through the practice of the present invention. Illustratively, in accordance with a number of features of the invention, a hollow gasket is provided with a ring that is secured to the gasket's outer surface. The ring is mounted on the gasket in the same plane as the gasket aperture that establishes communication between the process fluid and the hollow interior of the gasket. The gasket is seated in opposed aligned grooves formed in the opposing flange surfaces of two adjacent pipes or vessels that form the joint. The ring is clamped between the mutually opposing adjacent flanges of the abutting pipe sections thereby firmly seating the gasket within the grooves and between the flanges.

This gasket provides a superior high pressure seal, because the difference in pressure between the fluid within the pipe and the ambient environment outside of the joint causes the jaws, or limbs, of the C-shaped gasket to bear more securely against the surface of the grooves within which each of the respective jaws are seated. The outwardly disposed ring on the gasket also stabilizes the gasket seal during pressure operation and thermally induced movement, because it is gripped between the opposing flanges positively and forcefully.

Further in this respect, the ring also provides surfaces for channels that can receive O-rings, or other appropriate seals to provide a still tighter and more leakproof connection.

For a more complete appreciation of the invention, attention is invited to the following figures of the drawing which, when taken with the detailed description, disclose illustrative embodiments of the invention. The invention however is limited in scope only to the claims appended hereto.

Figure 1:
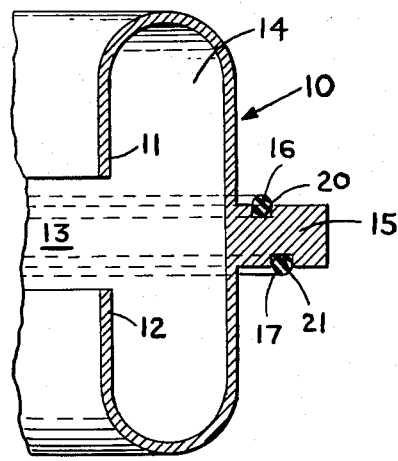
FIG. 1 is a fragmented, perspective, side elevational, sectioned view of a portion of a gasket that embodies principles of the present invention.

For a more complete understanding of the invention attention is invited to FIG. 1 which shows a metal gasket 10 that is for illustrative purposes annular in shape. The gasket 10 in cross section has a generally oval C shape in which opposing limbs or jaws 11, 12 that form the C are oriented toward the center of an annulus. These jaws 11, 12 create a gap 13 through which, as described subsequently in more detail, fluid communication can be established between the environment external to the gasket 10 and a hollow interior volume 14.

A radially outwardly disposed fin or ring 15 is formed on or attached to the gasket 10 at the back of the C and on its outer surface. The ring 15 is positioned on the gasket 10 opposite and in the same general plane as the gap 13.

It may be preferable, as shown in FIG. 1, to accommodate O-rings 16, 17 (or other appropriate supplementary fluid seals) in respective annular grooves 20, 21 that are formed on opposite parallel radially oriented surfaces of the ring 15.

Figure 7:
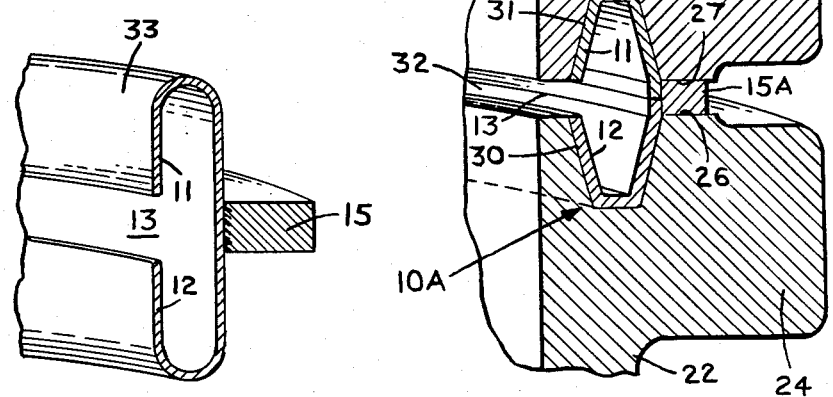
FIG. 7 is a fragmented, perspective, side elevational sectioned view of an installation in a flanged pipe joint of a typical gasket embodying principles of the present invention.

In keeping with another feature of the invention, the gasket 10 is not restricted to an annular configuration or to the C-shaped cross section shown in FIG. 1. For example, square or non circular flanges might require a similar gasket planform. An octagonal gasket cross section, as shown in FIG. 7, frequently is as well as other gasket cross section shapes.

Figure 2:
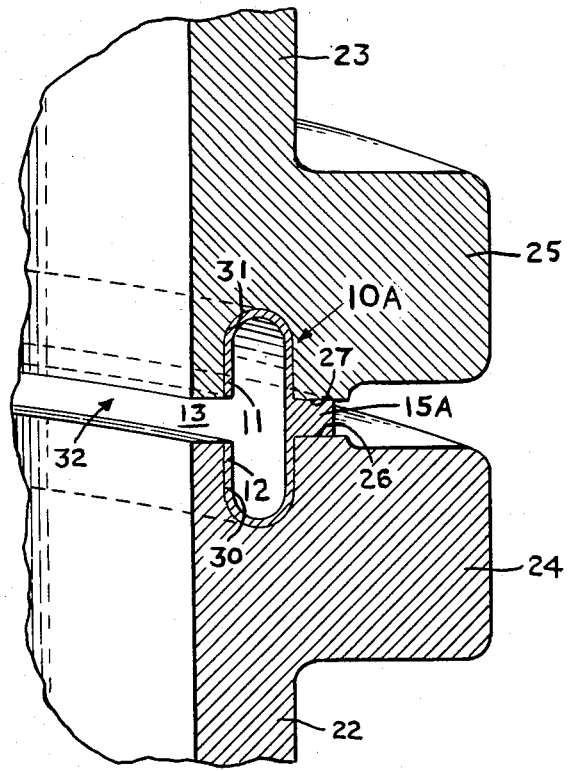
FIG. 2 is a fragmented, perspective, side elevational, sectioned view of an installation in a flanged pipe joint of another gasket embodying principles of the present invention.

In operation, and as best shown in FIG. 2, axially aligned pipe sections 22, 23 each terminate in respective annular flanges 24, 25. Opposing flange faces 26, 27 of the flanges 24, 25, respectively, are each provided with matching circular grooves 30, 31. The grooves 30, 31 are machined to form a close fit with outer surfaces of the respective jaws 11 and 12 of the metal gasket 10A which are received in these individual grooves.

The ring 15 is clamped tightly by means of bolts, or the like (not shown in FIGS. 2 or 7) between the opposing faces 26, 27 of the flanges 24, 25 respectively. As high pressure fluid is introduced into the pipe sections 22, 23, some of this pressurized fluid enters the hollow interior through an annular aperture 32 between the ends of the pipe sections 22, 23. The aperture 32 is in alignment with and generally matches the gap 13 between the opposing jaws 11, 12 of the gasket 10A. In this way a pressure difference is established between the hollow interior of the gasket 10A and the ambient environment pressure that is external to the pipe sections 22 and 23. This pressure difference causes the jaws 11, 12 to open and press outwardly against the surfaces of the grooves 30, 31. This essentially pivoting or hingelike action of the jaws 11, 12 forms an extremely tight and effective fluid seal.

The ring 15A is radially opposite to the gap 13 between the jaws 11, 12 of the gasket and is clamped between flange faces 26, 27 to establish proper alignment and spacing of the aperture 32 relative to the gap 13 in the gasket. In this manner free fluid communication is insured between the interior of the pipe sections 22, 23 and the interior gasket volume.

The ring 15A, positively clamped between the flanges 26, 27 also stabilizes the gasket 10A through thermal expansion and contraction as well as the hinging motion just described in order to protect the quality of the seal from being disturbed or degraded by movement, however slight.

Figures 3, 4, 5:
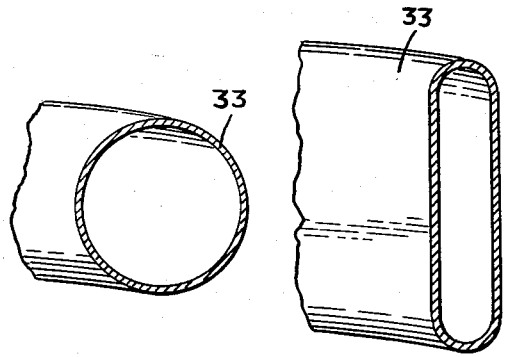
FIGS. 3 through 6 show; in successive, fragmented, perspective side elevational sectioned views; a manufacturing sequence for a gasket in accordance with a principal of the present invention.
Figure 6:
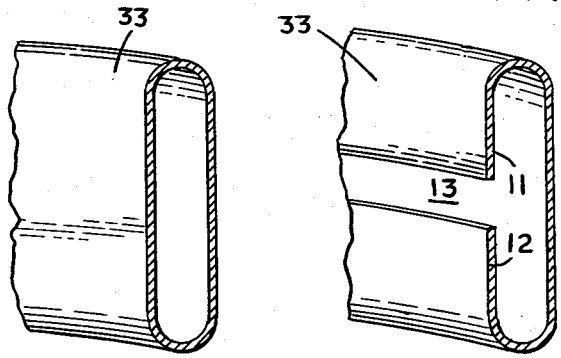

In order to manufacture a gasket of a type characterizing the invention, attention now is invited to FIG. 3 which shows a hollow metal tube 33. As shown in FIG. 4, the hollow metal tube 33 has been worked or otherwise suitably expanded to produce the oval transverse cross-section that is shown in the figure. In the next step of the manufacturing process, (FIG. 5) the gap 13 is formed by slitting, or the like to produce the opposing jaws 11, 12 of the expanded tube 33. FIG. 6 shows the final step in this phase of manufacture. Ring 15 is welded, or otherwise suitably attached to the outer surface of the tube 33 which has been expanded some more.

The gasket assembly shown in FIG. 7 is alike in structure and operation to that shown in FIG. 2.

In accordance with salient features of the present invention, an effective high pressure gasket is one that maintains a good seal in spite of temperature extremes without imposing a need for inordinate requirement for careful machining and expensive field preparations that have characterized the prior art.

I claim:

1. A gasket comprising a metal tube having a hollow interior, said tube having on one side thereof a pair of spaced jaws to establish a gap formed in said one side thereof in order to establish fluid communication between said hollow interior and the environment outside of said tube, and a fin protruding from the other side of said tube, said fin being in general alignment with said gap and having a width that is generally equal to said gap, said metal tube having an annular shape, said gap on said one tube side being oriented toward the center of said annulus, and said fin being disposed radially outward of said annular tube and forming a ring therearound, said ring further comprises at least one generally circular groove formed in the surface thereof, and a fluid seal seated in said circular groove.

2. A pipe joint comprising a pair of adjacent pipes each having a respective end in end-to-end relationship, each of said pipes having flanges formed on the respective adjacent ends thereof, said flanges each having a groove formed in the surface thereof and in mutual alignment with each other, and a hollow gasket with a fin protruding outwardly from one side thereof seated in said grooves, said fin being clamped between said flanges to establish a spacing between said flanges and to stabilize said gasket within said grooves, said gasket having on one side thereof a pair of spaced jaws to establish a gap formed on the side that is opposite to said fin thereby establishing a generally C-shaped gasket cross section to bear against said flanges and form a tight seal therewith, said gap having a dimension that is generally equal to the spacing between said flanges.

3. A pipe joint according to claim 2 wherein said fin further comprises at least one groove formed in the surface thereof and a fluid seal seated in said groove.

* * * * *